United States Patent
Hwang

(10) Patent No.: US 9,676,646 B2
(45) Date of Patent: Jun. 13, 2017

(54) APPARATUS FOR BLOW MOLDING GLASS BOTTLE, AND MOLDING METHOD THEREFOR

(71) Applicant: PACIFIC GLAS, Chungcheongnam-do (KR)

(72) Inventor: Jaeyeon Hwang, Chungcheongnam-do (KR)

(73) Assignee: PACIFIC GLAS, Chungcheongnam-do (KR)

( * ) Notice: Subject to any disclaimer, the term of this patent is extended or adjusted under 35 U.S.C. 154(b) by 197 days.

(21) Appl. No.: 14/420,155

(22) PCT Filed: Jun. 5, 2013

(86) PCT No.: PCT/KR2013/004968
§ 371 (c)(1),
(2) Date: Feb. 6, 2015

(87) PCT Pub. No.: WO2014/025133
PCT Pub. Date: Feb. 13, 2014

(65) Prior Publication Data
US 2015/0197441 A1    Jul. 16, 2015

(51) Int. Cl.
C03B 9/14 (2006.01)
C03B 9/32 (2006.01)
(Continued)

(52) U.S. Cl.
CPC ............. C03B 9/145 (2013.01); C03B 9/165 (2013.01); C03B 9/32 (2013.01); C03B 9/335 (2013.01);
(Continued)

(58) Field of Classification Search
CPC  C03B 9/145; C03B 9/165; C03B 9/32; C03B 9/335; C03B 9/36
See application file for complete search history.

(56) References Cited

U.S. PATENT DOCUMENTS 3,412,872 A * 11/1968 Cookson ............... B29C 49/421
   294/95
4,566,871 A *  1/1986 Hone .................. B29C 49/0073
   425/525
(Continued)

FOREIGN PATENT DOCUMENTS

JP   7029776 B2   4/1995
JP   3015732 B2   12/1997
(Continued)

*Primary Examiner* — Jodi C Franklin
(74) *Attorney, Agent, or Firm* — Rabin & Berdo, P.C.

(57) ABSTRACT

The present invention relates to an apparatus for blow-molding a glass bottle, and more particularly, to an apparatus for blow-molding a glass bottle in which molding air is injected into a pair of mold bodies such that molten glass accommodated in the mold bodies is formed into a glass bottle and a groove is formed at the center of the inner side of the bottom surface of the glass bottle. The apparatus for blow-molding a glass bottle of the present invention uses a blow mold (10) configured to include: a pair of mold bodies (11) forming a tubular body; a base mold (12) which molds the bottom surface of the glass bottle; and a blowing head (13) which are arranged in the upper portions of the mold bodies (11) and into which molding air is injected such that the glass bottle is expanded after primary molding and closely contacts the inner walls of the mold bodies (11) and the base mold (12). A groove molder (20) is provided on the inner circumferential edge portion of the blowing head (13) such that a groove portion (15) can be molded on the inner side of the bottom surface of the glass bottle (14).

8 Claims, 13 Drawing Sheets

(51) Int. Cl.
*C03B 9/36* (2006.01)
*C03B 9/16* (2006.01)
*C03B 9/335* (2006.01)

(52) U.S. Cl.
CPC ............. *C03B 9/36* (2013.01); *C03B 9/3618* (2013.01); *C03B 9/3636* (2013.01); *C03B 9/3663* (2013.01); *C03B 9/3681* (2013.01)

(56) References Cited

U.S. PATENT DOCUMENTS

| | | | | |
|---|---|---|---|---|
| 4,708,730 | A * | 11/1987 | Ziegler | C03B 9/3609 65/114 |
| 4,863,046 | A * | 9/1989 | Collette | B29C 49/0073 215/381 |
| 5,637,167 | A * | 6/1997 | Krishnakumar | B29C 65/665 156/85 |
| 8,097,662 | B2 * | 1/2012 | Schmidt | A23L 3/3436 428/35.7 |
| 2002/0022099 | A1 * | 2/2002 | Schmidt | B32B 27/18 428/35.7 |
| 2011/0067449 | A1 * | 3/2011 | Ringuette | C03B 9/3618 65/72 |

FOREIGN PATENT DOCUMENTS

| | | |
|---|---|---|
| JP | 2000-016817 A | 1/2000 |
| JP | 2000-053426 A | 2/2000 |

* cited by examiner

APPARATUS FOR BLOW MOLDING GLASS BOTTLE, AND MOLDING METHOD THEREFOR

TECHNICAL FIELD

The present invention relates to an apparatus for blow-molding a glass bottle and a method for molding the same and, more particularly, to an apparatus for blow-molding a glass bottle and a method for molding the same, which injects molding air into a pair of molding bodies to mold a glass bottle from molten glass received inside the molding bodies, and forms a groove at the center of the inner bottom surface of the glass bottle using a groove molder.

Background Art

In general, methods for molding a glass bottle are largely classified into the blow molding method, the pressing molding method, and the casing molding method, and the above-mentioned methods manufacture a glass bottle by injecting glass gob into a mold.

The blow molding method is one of the glass molding methods which are mainly used for manufacturing a glass bottle. Before an apparatus for molding a glass bottle using the blow molding method is described, not a specific glass bottle but a product will be exemplified as the shape of a glass bottle herein, which can be variously molded according to the mold.

That is, FIG. 1 illustrates an apparatus for blow-molding a glass bottle, which includes: a first mold 100 including a settle blow 112 formed at the upper portion of a blank mold 111, in which a parison 110 is received, to mold a curved portion of the bottom surface of the glass bottle, a pair of tubular first mold bodies 113 formed at the lower portion of the blank mold 111, a neck ring mold 114 formed at the lower portion of the first mold body 113 to mold a bottle neck of the glass bottle, and a plunger 115 for molding an opening of the glass bottle; a rotary body for gripping the bottle neck of the glass bottle by a clamp 121 to rotate the bottle neck of the glass bottle to face the upper side; and a second mold 130 including a pair of tubular second mold bodies 131, a base mold 132 formed at the lower portion of the second mold bodies 131 to mold the lower portion of the glass bottle, and a head formed at the upper portion of the second mold bodies 131 to allow the glass bottle to be expanded to and be in close contact with the inner wall of the second mold bodies 131 by injecting molding air.

An operation of the apparatus for blow-molding a glass bottle will be described. When molding air is injected into the parison 110 received in the blank mold 111 after the settle blow 112 disposed at the upper portion of the blank mold 111 is lowered, the parison 110 comes into close contact with the inner wall of the first mold bodies 113 and the inner peripheral portion of the neck ring mold 114. Here, the upper portion of the parison is formed in an arc shape.

Next, when the plunger 115 disposed inside the neck ring mold 114 is moved to the lower portion, a space is formed between the neck ring mold 114 and the plunger 115, molding air is injected into the space, the parison 110 is divided to both sides simultaneously while a groove is formed at the center of the parison 110, and the inner wall of the first mold bodies 113 and the lower portion of the settle blow 112 come into close contact with the parison, so that a first glass bottle is molded.

A bottle neck of the above-molded first glass bottle is rotated while being gripped by the clamp 121 of the rotary body 120, such that the lower portion of the bottle neck faces the upper side. At the same time, the glass bottle is located at the upper portion of the base mold 132.

When the first glass bottle is located on the base mold 132, the second mold bodies 131, which have been divided into both sides, move toward the first glass bottle, the both sides are coupled to each other, and the blow head 133 is positioned on the second mold bodies 131.

Then, the blow head injects molding air to the glass bottle while the outer peripheral portion of the bottle neck of the glass bottle is gripped, and the firstly-molded glass bottle comes into contact with the inner wall of the second mold bodies 131 and the base mold 132 while being expanded, so that a second glass bottle is molded.

When the sectional surface of the secondly-molded glass bottle is identified, it can be identified that the inner bottom surface of the glass bottle is molded in a horizontal state as illustrated in FIG. 2.

However, when the glass bottle is used as a dispenser container which discharges contents using a pump in a state in which the inner bottom surface of the glass bottle is in a horizontal state, as illustrated in FIG. 3, if the amount of the contents stored therein is larger than a predetermined level, the contents are easily discharged. However, if the contents are discharged and the water level of the contents is close to the bottom, a discharge tube for discharging contents is not functioned well in a state in which the contents are entirely dispersed on the horizontal surface, and a predetermined amount of the contents is not discharged, so that use thereof is inconvenient, and the remaining contents cannot be used and is wasted.

DISCLOSURE

Technical Problem

The present invention has been made in an effort to solve the above-described problems, an aspect of the present invention to provide a glass bottle in which a groove is formed on the center of the inner bottom surface of the glass bottle formed in a tubular body, using a groove molder, thereby discharging all of contents by a pumping means such as a dispenser as illustrated in FIG. 9.

Technical Solution

In accordance with an aspect of the present invention, there is provided an apparatus for blow-molding a glass bottle by a blow mold (10), the apparatus including: a pair of tubular mold bodies (11); a base mold (12) for molding a bottom surface of the glass bottle; and a blow head (13) formed at an upper portion of the mold bodies (11) to inject molding air so that a firstly-molded glass bottle is expanded to and comes into close contact with the mold bodies (11) and the inner wall of the base mold (12), wherein a groove molder (20) is formed at an inner peripheral portion of the blow head (13) such that a groove portion (15) is formed on an inner bottom surface of a glass bottle (14).

In accordance with another aspect of the present invention, there is provided a method of blow-molding a glass bottle by a blow mold (10), the method including: a glass bottle molding preparing step (S1) before secondly molding a base mold (12) disposed at the lower side of a pair of tubular mold bodies (11) and a firstly molded glass bottle (14); a glass bottle molding step (S2) in which a blow head (13) is positioned on the mold bodies (11), and when molding air is injected, the first glass bottle (14) comes into contact with the inner wall of the mold bodies (11) and the base mold (12) so as to be molded into a second glass bottle; a piston rod lowering step (S3) of lowering a piston rod (21) of a groove molder (20) disposed at an inner peripheral portion of the blow head (13); a groove forming step (S4) of forming a groove portion (15) on an inner bottom surface of the glass bottle (14) by lowering the piston rod (21); and a piston rod raising step (S5) of raising and returning the piston rod (21), which has been lowered.

Advantageous Effects

The present invention provides a glass bottle in which a groove is formed at the center of the inner bottom surface of the glass bottle and, when a dispenser such as a discharging pump is used, a discharge tube disposed in the dispenser is located at the groove, so that all of contents in the glass bottle can be discharged.

BEST MODE

Mode for Invention

Hereinafter, the present invention will be described in detail with reference to the accompanying drawings.

Figure 1:
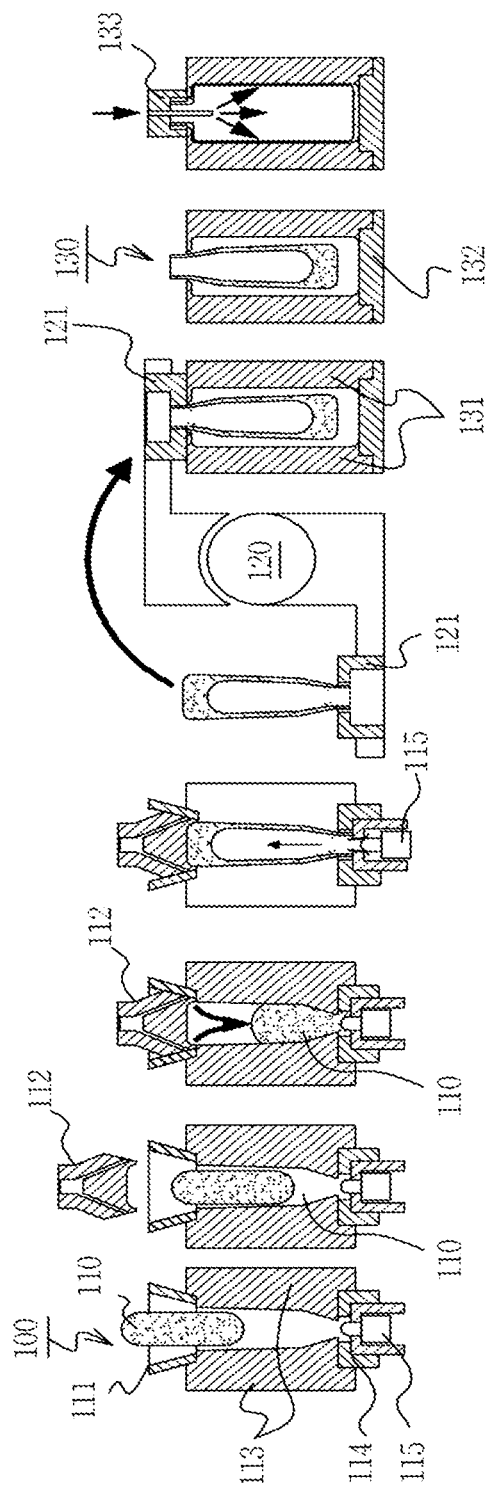
FIG. 1 is a schematic view illustrating an apparatus for blow-molding a glass bottle according to the related art.
Figure 2:
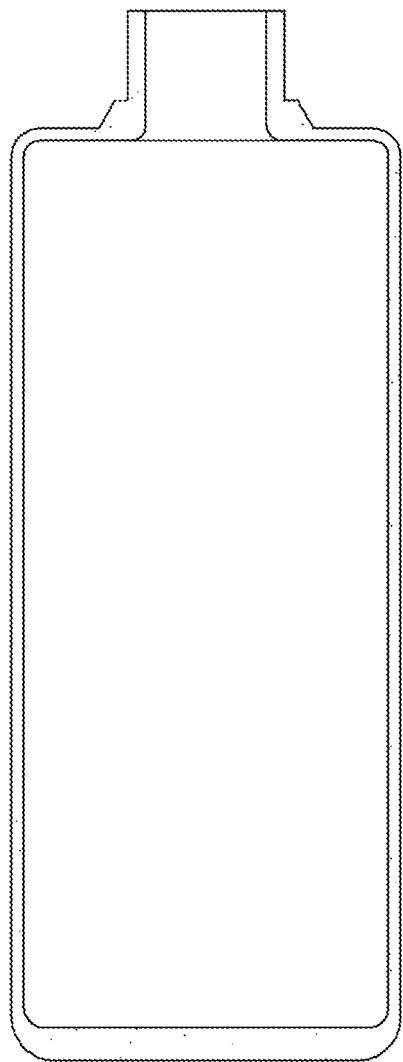
FIG. 2 is a sectional view illustrating a glass bottle molded by a process of blow-molding a glass bottle according to the related art.
Figure 3:
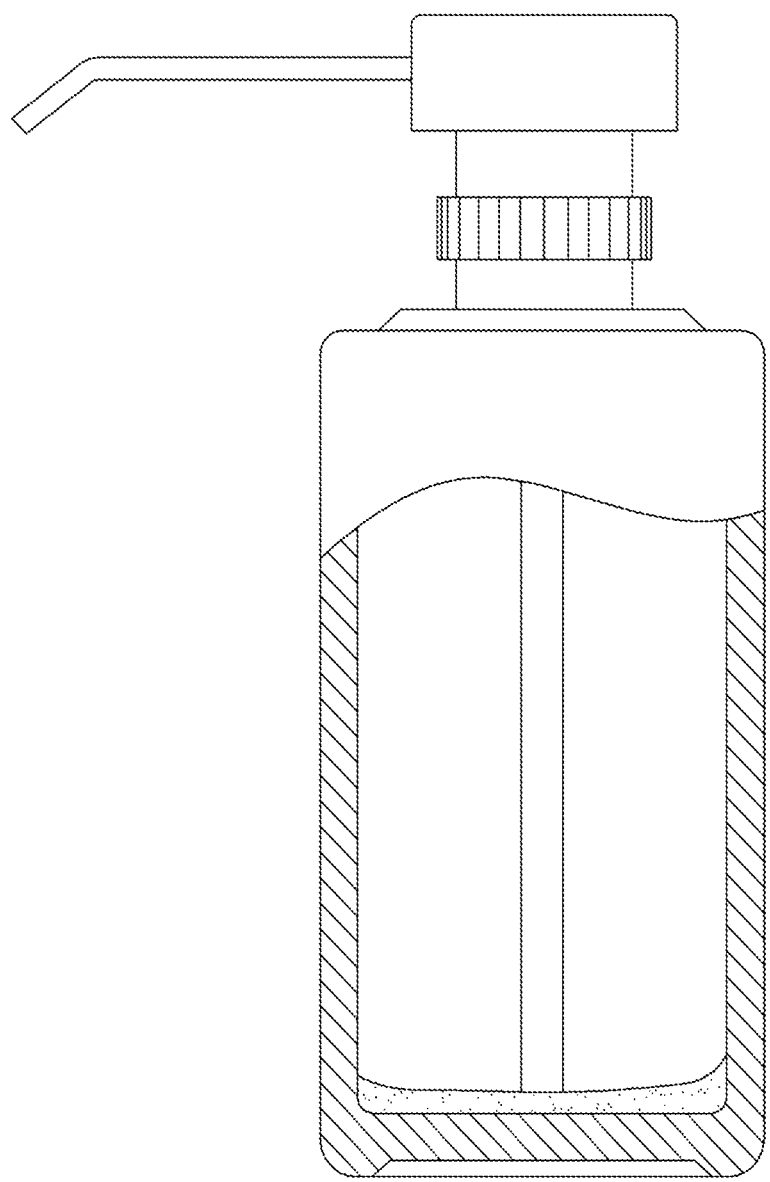
FIG. 3 is a sectional view illustrating a use state in which a glass bottle molded by a process of blow-molding a glass bottle is applied to a dispersing container according to the related art.
Figure 4:
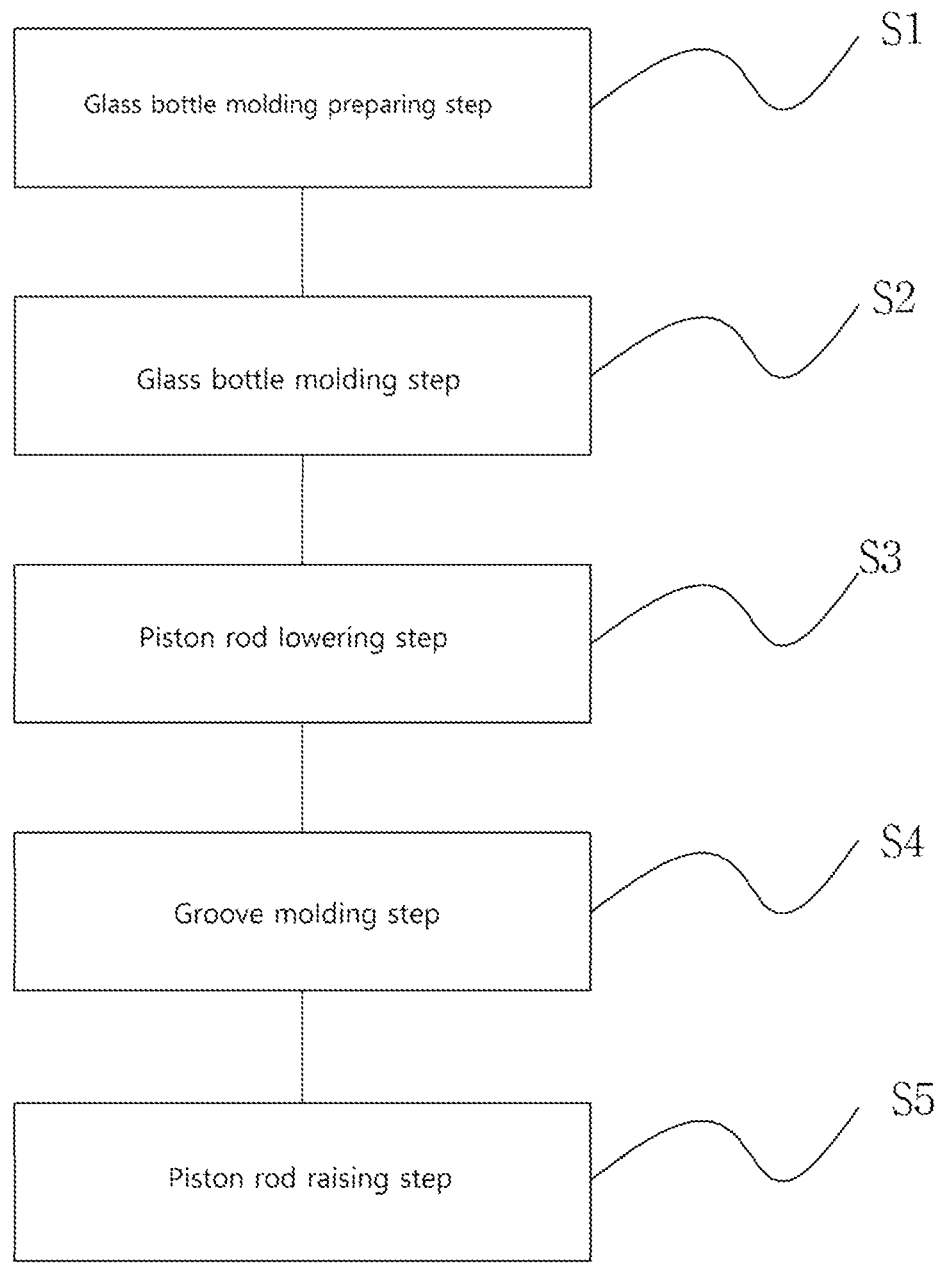
FIG. 4 is a block diagram illustrating a process of blow-molding a glass bottle according to the present invention.

First, as illustrated in FIG. 4, a method of blow-molding a glass bottle by a blow mold 10 according to the present invention includes: a glass bottle molding preparing step (S1) before secondly molding a base mold 12 disposed at the lower side of a pair of tubular mold bodies 11 and a firstly molded glass bottle 14; a glass bottle molding step (S2) in which a blow head 13 is positioned on the mold bodies 11, and when molding air is injected, the first glass bottle 14 comes into contact with the inner wall of the mold bodies 11 and the base mold 12 so as to be molded into a second glass bottle; a piston rod lowering step (S3) of lowering a piston rod 21 of a groove molder 20 disposed at an inner peripheral portion of the blow head 13; a groove forming step (S4) of forming a groove portion 15 on an inner bottom surface of the glass bottle 14 by lowering the piston rod 21; and a piston rod raising step (S5) of raising and returning the piston rod 21, which has been lowered.

Figure 5:
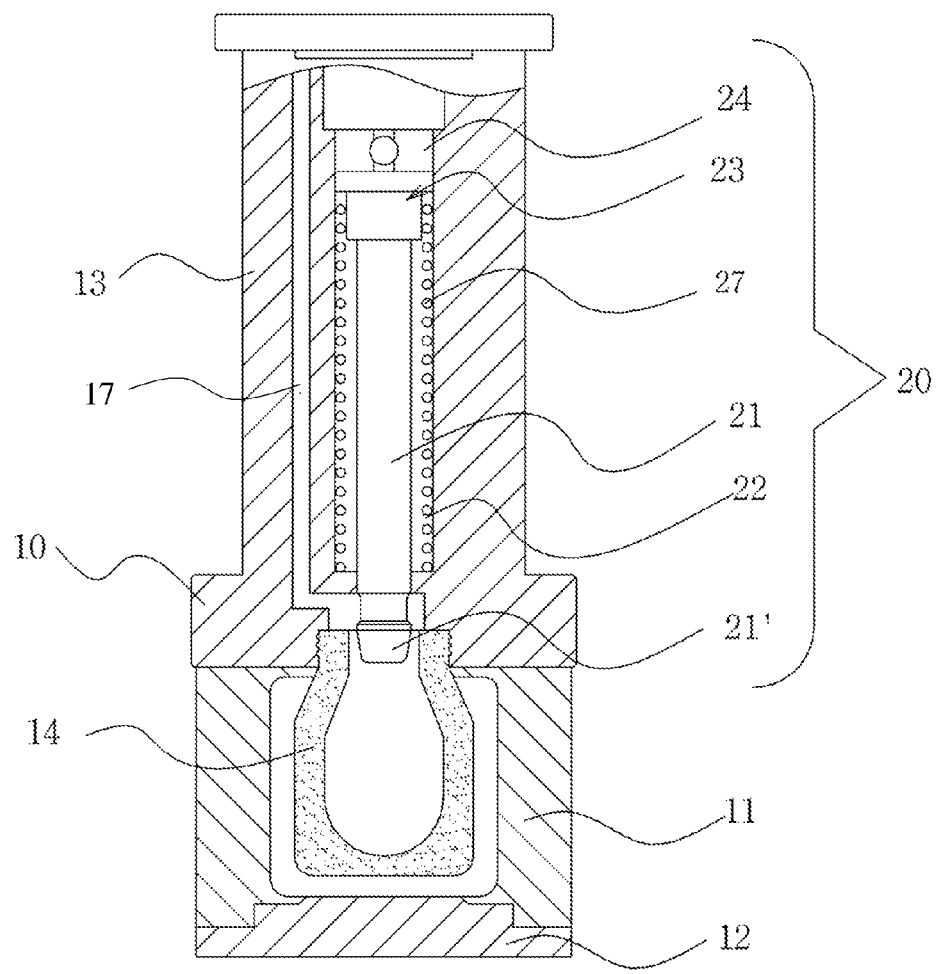
FIG. 5 is a sectional view illustrating an apparatus for blow-molding a glass bottle according to the present invention.

Further, as illustrated in FIG. 5, an apparatus for forming a glass bottle by blow according to the present invention comprises: a pair of tubular mold bodies 11 for gripping a neck portion of the glass bottle 14 and receiving a body of the glass bottle; a base mold 12 formed at the lower side of the mold bodies 11; and a blow head 13 formed at the upper portion of the mold bodies 11 and configured to inject molding air through an air passage 17 such that the glass bottle 14 is expanded to and comes into close contact with the inner wall of the mold bodies 11.

Further, the groove molder 12 is installed at the inner peripheral portion of the blow head 13 such that the groove portion 15 is formed on the inner bottom surface of the glass bottle 14, a rectilinear acting part 23 is formed at the upper portion of the groove molder 20 such that the piston rod 21 at the lower portion can be lowered along a guide hole 22, and the rectilinear acting part 23 may be one selected from a single-acting cylinder 24 or a double-acting cylinder 25, and a cam 26.

Further, an elastic member 27 is formed at the inner peripheral portion of the guide hole 22 such that the piston rod 21 is lowered and then returns to its original position, and the elastic member 27 may be a spring.

Further, a skirt-shaped punch protrusion 21' is formed at an end of the piston rod 21, so that the skirt-shaped groove portion 15 corresponding to the punch protrusion 21' is formed at the center of the inner bottom surface of the glass bottle 14.

Figure 10A:
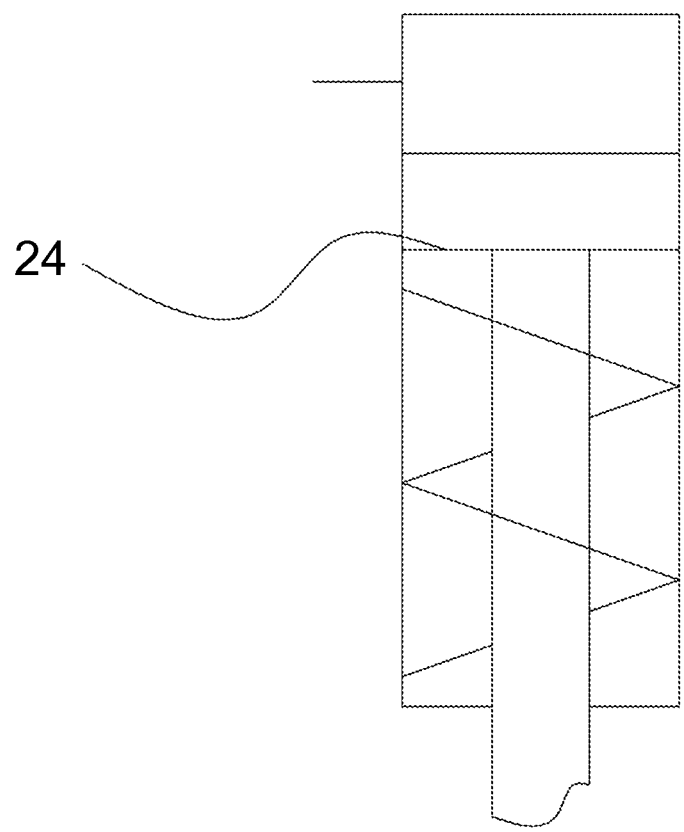
FIGS. 10A, 10B, and 10C are state diagrams illustrating a single-acting cylinder, a double-acting cylinder, and a cam which are applied to a rectilinear acting part applied to the present invention.
Figure 10B:
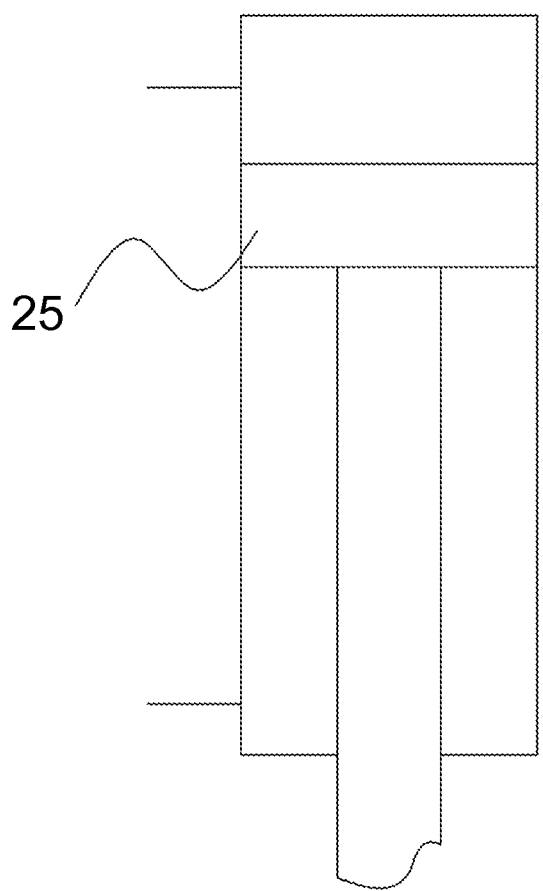
Figure 10C:
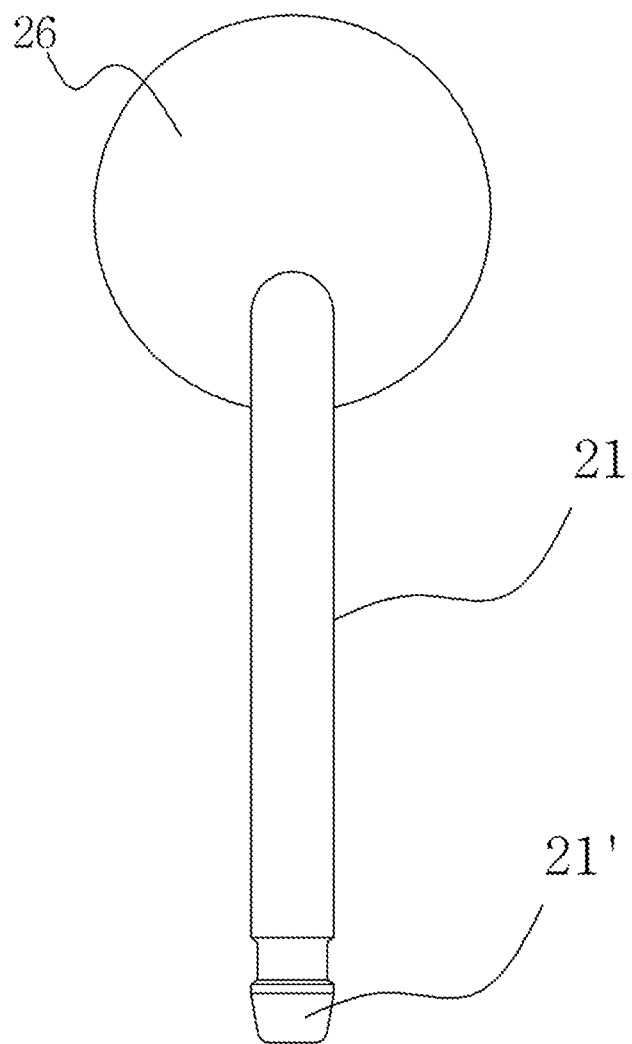
Figure 11A:
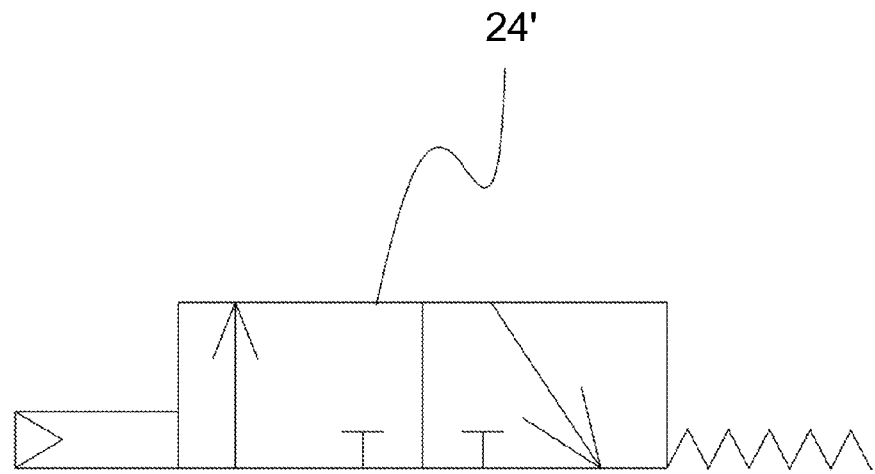
FIGS. 11A and 11B are state diagrams illustrating a solenoid valve applied to the present invention.
Figure 11B:
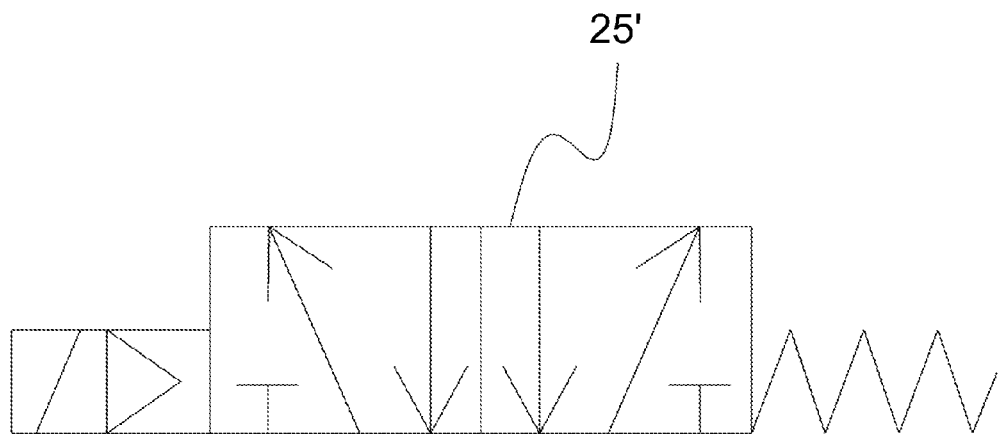

Further, as illustrated in FIGS. 10 to 11, a 3/2 way solenoid valve 24' is applied to the single-acting cylinder 24, and a 5/2 way solenoid valve 25' is applied to the double-acting cylinder 25.

An operation of the present invention as configured above will be described below.

First, as illustrated in FIG. 5, a bottle neck of the glass bottle 14 is headed to the upper portion, the pair of mold bodies 11 for gripping the neck portion of the glass bottle and receiving the body of the glass bottle 15 are in close contact with and coupled to each other at the upper portion of the base mold 12, and the blow head 13 is positioned on the mold bodies 11. At this time, the blow head 13 grips the outer peripheral portion of the neck portion of the glass bottle 14.

Figure 6:
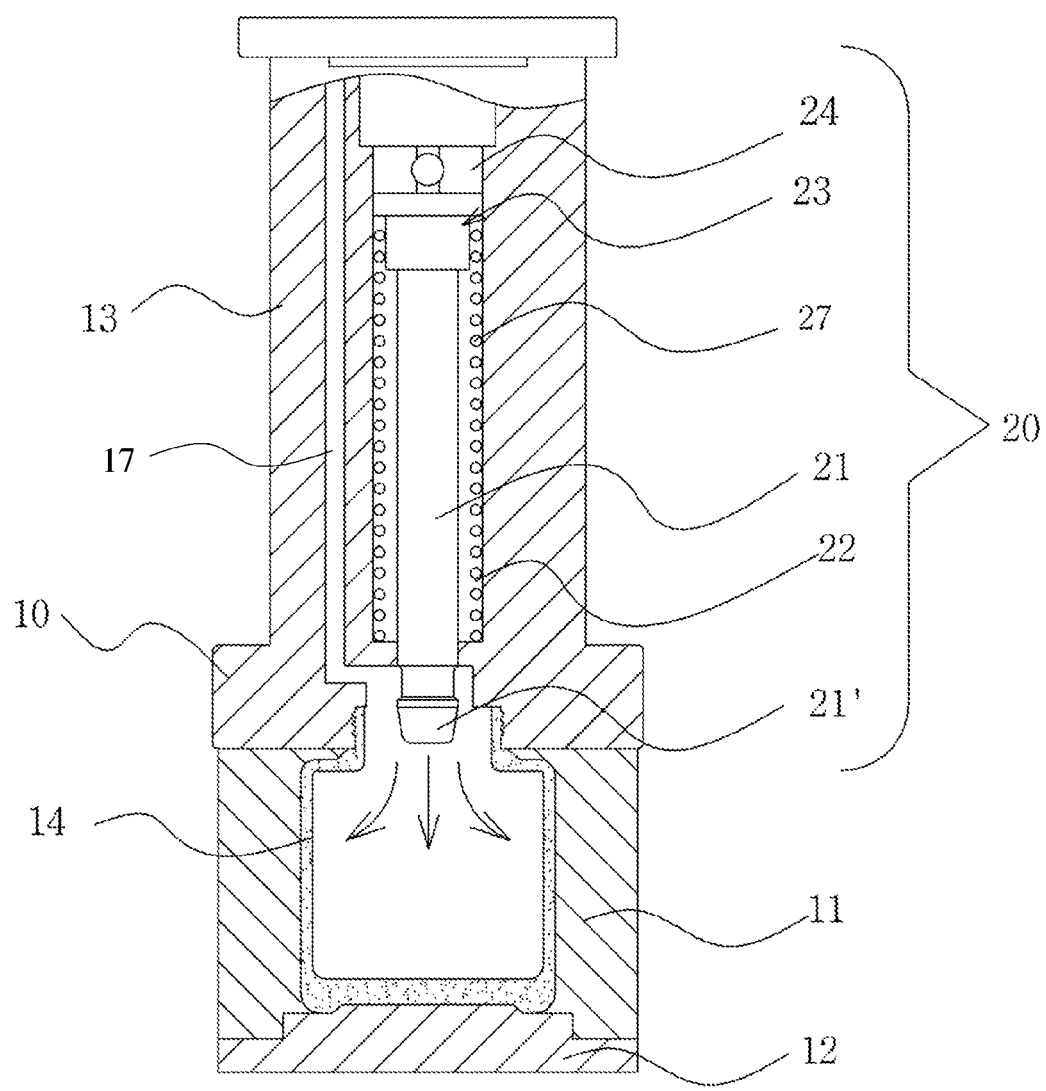
FIGS. 6 to 7 illustrate operations of blow-molding a glass bottle according to the present invention.

As described above, the blow head 13 grips the neck portion of the glass bottle 14, and as illustrated in FIG. 6, when molding air is injected through the air passage 17 of the blow head 13, the glass bottle 14 received in the mold bodies 11 comes into contact with the inner wall of the mold bodies 11 and the base mold 12 while being expanded.

Figure 7:
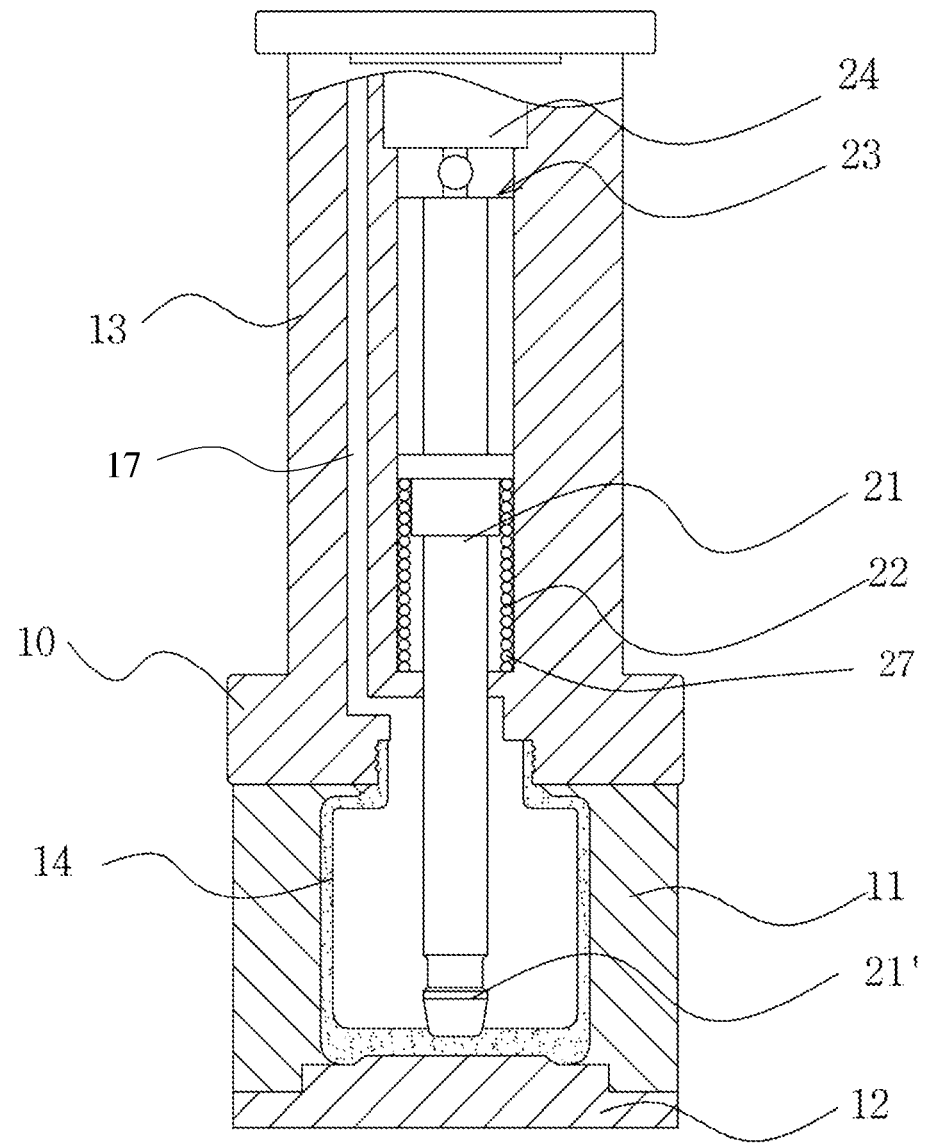

Next, as illustrated in FIG. 7, when the groove molder 20 provided inside the blow head 13 is operated, the single-acting cylinder 24 of the rectilinear acting part 23 lowers the piston rod 21 by an operation of 3/2 way solenoid valve 24', the punch protrusion 21' integrally formed with one end of the piston rod 21 molds the groove 15 on the bottom surface inside the glass bottle 14, and the piston rod 21 is raised and then returns to its original position. At this time, the piston rod 21 is raised to two ways. In one way, as illustrated in FIGS. 10A to 11A, when the single-acting cylinder 24 is a 3/2 way solenoid valve 24', the piston rod 21 returns by elasticity of the elastic member 27 in the guide hole 22. In the other way, as illustrated in FIGS. 10B to 11B, when the double-acting cylinder 25 is a 5/2 way solenoid valve 25', the piston rod 21 is raised regardless of the elastic member 27. Herein, detailed operations of the 3/2 way solenoid valve 24' and the 5/2 way solenoid valve 25', which are widely-known practices, will be omitted.

Figure 8:
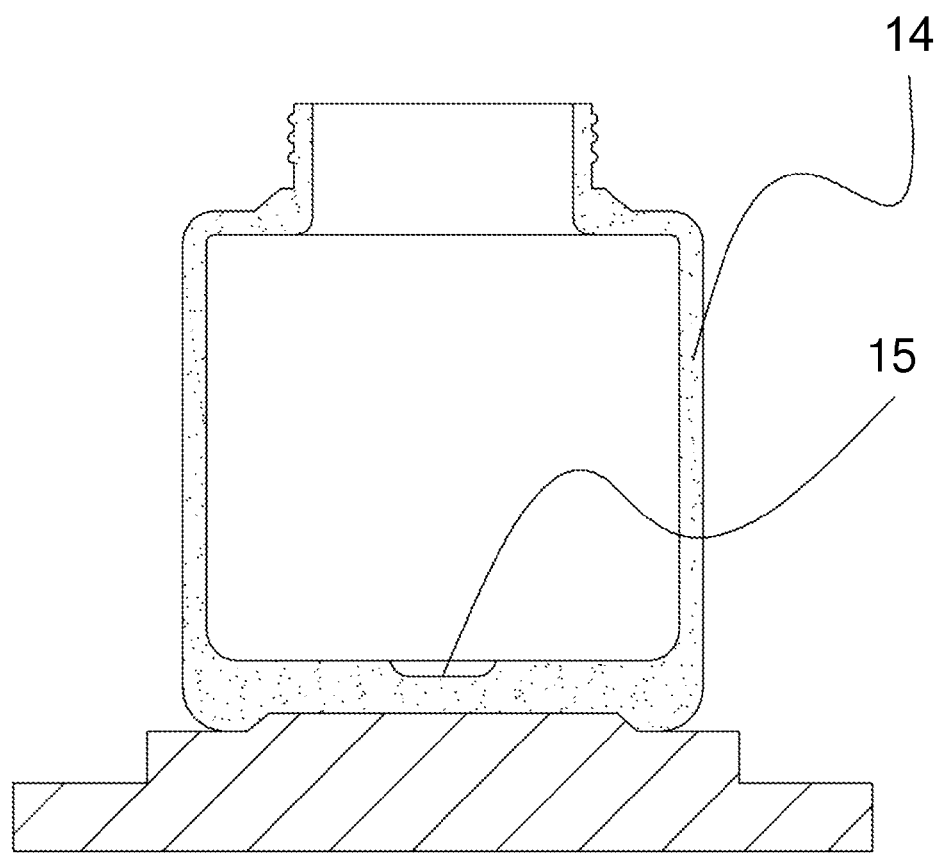
FIG. 8 is a sectional view illustrating a glass bottle molded by an apparatus for blow-molding a glass bottle according to the present invention.

As described above, in the glass bottle 14 in which the groove portion 15 is formed by an operation of the single-acting cylinder 24 or the double-acting cylinder 25, as illustrated in FIG. 8, it can be identified that the groove portion 15 is formed on the bottom surface inside the glass bottle 14.

Figure 9:
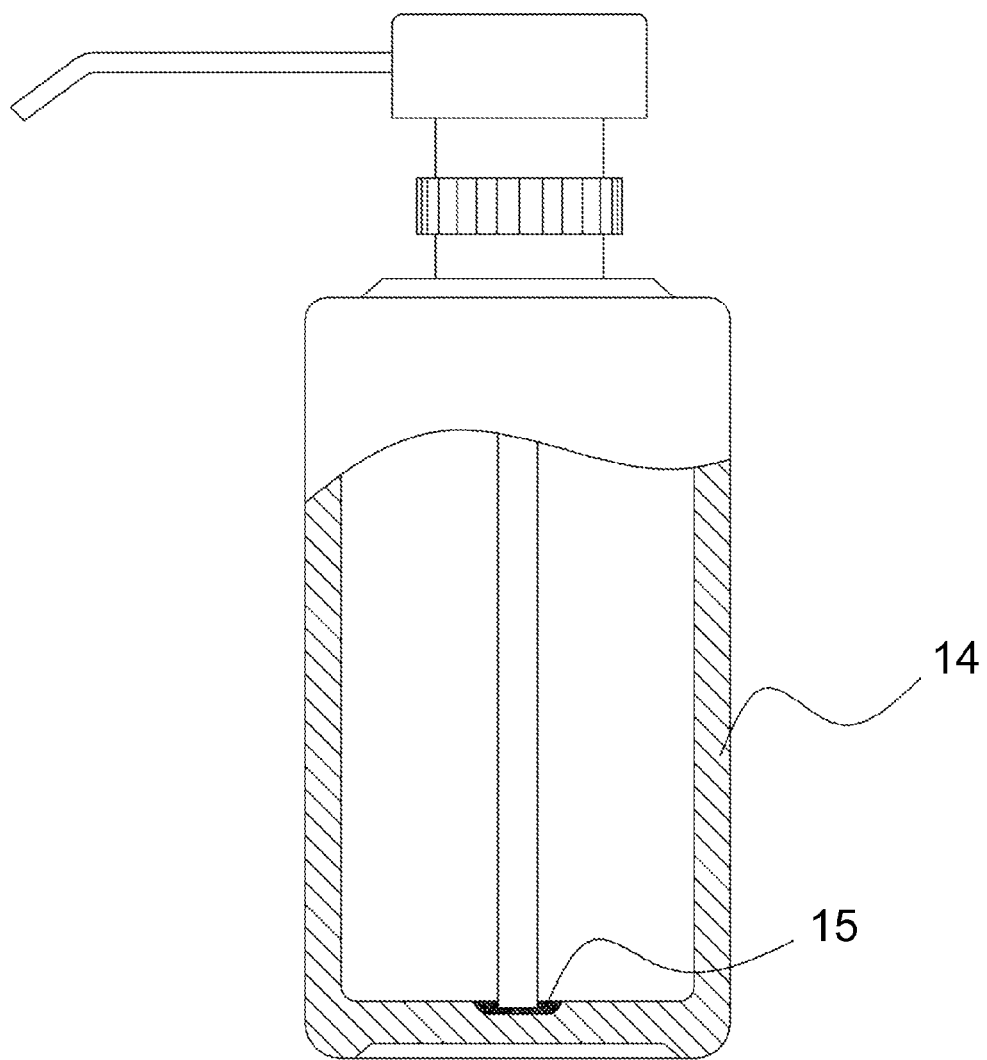
FIG. 9 is a sectional view illustrating a state in which a discharge pump is mounted to a glass bottle molded by the present invention.

As described above, when a dispenser such as a discharge pump is used in the glass bottle 14 in which the groove portion 15 is formed on the inner bottom surface of the glass bottle 14, as illustrated in FIG. 9, a discharge tube of the dispenser is positioned on the groove portion 15 and remaining contents in the glass bottle is collected in the groove portion 15 so as to be discharged to the discharge tube.

As described above, the present invention is not limited to the above-mentioned embodiment, and may be implemented through modification and change without departing from the subject matter of the present invention, and it should be considered that the medication and the change belong to the technical spirit of the present invention.

DESCRIPTION OF REFERENCE NUMERALS

| | |
|---|---|
| 10: Blow mold | 11: Pair of mold bodies |
| 12: Base mold | 13: Blow head |
| 14: Glass bottle | 16: Groove portion |
| 20: Groove molder | 21: Discharge pump |
| 22: Guide hole | 23: Rectilinear acting part |
| 24: Single-acting cylinder | |
| 25: Double-acting cylinder | |
| 26: Cam | 27: Elastic member |
| 21': Punch protrusion | |
| 24': 3/2 way solenoid valve | |
| 25': 5/2 way solenoid valve | |
| S1: Glass bottle molding preparing step | |
| S2: Glass bottle molding step | |
| S3: Piston rod lowering step | |
| S4: Groove forming step | |
| S5: Piston rod lowering step | |

What is claimed is:

1. An apparatus for blow-molding a glass bottle by a blow mold, the apparatus comprising:
   a pair of mold bodies forming side walls of a lower portion of the blow mold;
   a base mold forming a bottom wall of the lower portion of the blow mold for molding a bottom of the glass bottle; and
   a blow head disposed on the mold bodies, the blow head including
      a guide hole formed in a center portion of the blow head and extending in a vertical direction,
      a rectilinear acting part disposed inside the guide hole and including a piston rod, wherein the piston rod is configured to reciprocally move in the vertical direction along the guide hole,
      a punch protrusion formed on an end of the piston rod and configured to mold a groove on the bottom of the glass bottle,
      an elastic member disposed inside the guide hole with surrounding the piston rod, wherein an end of the elastic member support a lower portion of the rectilinear acting part, and
      an air passage formed inside the blow head separately from the guide hole, wherein the air passage is disposed outside the guide hole and configured to inject molding air so that a firstly-molded glass bottle is expanded to and comes into close contact with the mold bodies and the base mold.

2. The apparatus of claim 1, wherein the rectilinear acting part is one selected from a single-acting cylinder or a double-acting cylinder and a cam.

3. The apparatus of claim 2, wherein the single-acting cylinder (24) acts as a 3/2 way solenoid valve (24').

4. The apparatus of claim 2, wherein the double-acting cylinder (25) acts as a 5/2 way solenoid valve (25').

5. The apparatus of claim 1, wherein the punch protrusion has a truncated cone shape.

6. The apparatus of claim 1, wherein the elastic member is configured to lower the piston rod and return the piston rod to its original position.

7. The apparatus of claim 6, wherein the elastic member is formed by a coil spring.

8. A method of blow-molding a glass bottle by a blow mold, the blow mold comprising
   a pair of mold bodies forming side walls of a lower portion of the blow mold;
   a base mold forming a bottom wall of the lower portion of the blow mold for molding a bottom of the glass bottle; and
   a blow head disposed on the mold bodies, the blow head including
      a guide hole formed in a center portion of the blow head and extending in a vertical direction,
      a rectilinear acting part disposed inside the guide hole and including a piston rod, wherein the piston rod is configured to reciprocally move in the vertical direction along the guide hole,
      a punch protrusion formed on an end of the piston rod and configured to mold a groove on the bottom of the glass bottle,
      an elastic member disposed inside the guide hole with surrounding the piston rod, wherein an end of the elastic member support a lower portion of the rectilinear acting part, and
      an air passage formed inside the blow head separately from the guide hole, wherein the air passage is disposed outside the guide hole and configured to inject molding air so that a firstly-molded glass bottle is expanded to and comes into close contact with the mold bodies and the base mold,
   the method comprising:
   setting a firstly-molded glass bottle in an inner space formed by the pair of mold bodies and the base mold;
   injecting molding air through the air passage into the inner space so that the first firstly-molded glass bottle comes into contact with walls of the inner space formed by the mold bodies and the base mold so as to be molded into a secondly-molded glass bottle;
   lowering the piston rod by the rectilinear acting part such that the punch protrusion formed on the end of the piston rod forms a groove portion on the bottom of the secondly-molded glass bottle (14); and
   returning the piston rod to its original position by the rectilinear acting part or the elastic member.

* * * * *